United States Patent
Klöfer et al.

(10) Patent No.: US 12,449,294 B2
(45) Date of Patent: Oct. 21, 2025

(54) FILLING VOLUME MEASUREMENT

(71) Applicant: Endress+Hauser SE+Co. KG, Maulburg (DE)

(72) Inventors: Peter Klöfer, Steinen (DE); Winfried Mayer, Buch (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 309 days.

(21) Appl. No.: 18/254,196

(22) PCT Filed: Oct. 28, 2021

(86) PCT No.: PCT/EP2021/080026
§ 371 (c)(1),
(2) Date: May 24, 2023

(87) PCT Pub. No.: WO2022/111942
PCT Pub. Date: Jun. 2, 2022

(65) Prior Publication Data
US 2024/0027252 A1    Jan. 25, 2024

(30) Foreign Application Priority Data
Nov. 27, 2020  (DE) ............... 10 2020 131 565.1

(51) Int. Cl.
*G01F 17/00*   (2006.01)
*G01F 23/284*  (2006.01)
(Continued)

(52) U.S. Cl.
CPC ............ *G01F 17/00* (2013.01); *G01F 23/284* (2013.01); *G01S 13/867* (2013.01); *G01S 13/88* (2013.01)

(58) Field of Classification Search
CPC ...... G01F 17/00; G01F 23/284; G01F 23/292; G01S 13/867; G01S 13/88
See application file for complete search history.

(56) References Cited

U.S. PATENT DOCUMENTS

2004/0031335 A1   2/2004  Fromme et al.
2012/0281096 A1  11/2012  Gellaboina et al.
(Continued)

FOREIGN PATENT DOCUMENTS

CN    111656148 A    9/2020
DE      3942239 A1   7/1991
(Continued)

OTHER PUBLICATIONS

English Machine Translation of DE 102018102366 A1, translated online May 2025 (Year: 2018).*

*Primary Examiner* — David Z Huang
(74) *Attorney, Agent, or Firm* — Mark A. Logan; Endress+Hauser (USA) Holding, Inc.

(57) ABSTRACT

A measuring system for determining a filling volume of a filling material in a container comprises a 3D camera and a radar-based fill-level measurement device. The 3D camera is used to initially record at least one 3D image of at least one partial region of the empty container interior. Based on the 3D images, a data set or a digital spatial model is created by which at least such partial region the geometry of the empty container interior is represented. To create the required, three-dimensional surface or level profile, the fill-level measurement device is based on a principle of digital beam shaping, such as the MIMO principle. Thus, based on the data set reflecting the geometry in the container interior and based on the fill-level profile, the filling volume in the container can be determined.

7 Claims, 2 Drawing Sheets

(51) Int. Cl.
  *G01S 13/86* (2006.01)
  *G01S 13/88* (2006.01)

(56) References Cited

U.S. PATENT DOCUMENTS

2018/0106602 A1* 4/2018 Welle .................. H01Q 21/205
2020/0319013 A1 10/2020 Palatini et al.

FOREIGN PATENT DOCUMENTS

| | | | | |
|---|---|---|---|---|
| DE | 102010014457 A1 | 10/2011 | | |
| DE | 102012104090 A1 | 11/2013 | | |
| DE | 102016111570 A1 | 12/2017 | | |
| DE | 102018102366 A1 * | 8/2019 | ............ | G01B 15/08 |
| EP | 2930476 A1 | 10/2015 | | |
| EP | 3171138 A1 | 5/2017 | | |
| JP | 2004226264 A | 8/2004 | | |
| JP | 2020008422 A | 1/2020 | | |
| WO | 2020174043 A1 | 9/2020 | | |

* cited by examiner

FILLING VOLUME MEASUREMENT

CROSS-REFERENCE TO RELATED APPLICATIONS

The present application is related to and claims the priority benefit of DPMA Patent Application No. 10 2020 131 565.1, filed on Nov. 27, 2020, and International Patent Application No. PCT/EP2021/080026, filed Oct. 28, 2021, the entire contents of which are incorporated herein by reference.

TECHNICAL FIELD

The invention relates to a measuring system and a method for determining a filling volume of a filling material in a container.

BACKGROUND

In process automation, corresponding field devices are used for capturing relevant process parameters. For the purpose of capturing the respective process parameters, suitable measuring principles are therefore implemented in the corresponding field devices, in order to capture as process parameters, for example a fill level, a flow, a pressure, a temperature, a pH value, a redox potential or a conductivity. A wide variety of such field devices is manufactured and distributed by the Endress+Hauser company.

For measuring the fill level of filling materials in containers, contactless measuring methods have become established, because they are robust and require minimum maintenance. A further advantage of contactless measuring methods consists in the ability to be able to measure the fill level quasi-continuously. Radar-based measuring methods are therefore predominantly used in the field of continuous fill-level measurement (in the context of this patent application, "radar" refers to signals or electromagnetic waves with frequencies between 0.03 GHz and 300 GHz). An established measurement method is FMCW ("frequency-modulated continuous wave"). The FMCW-based fill-level measuring method is described, for example, in published patent application DE 10 2013 108 490 A1.

By means of the FMCW method, it is possible to measure distance or fill level at least selectively. The point at which the fill level is measured depends on the orientation of the transmitting/receiving antenna or the direction of its beam lobe (due to the generally reciprocal properties of antennas, the characteristic or beam angle of the beam lobe of the respective antenna is independent of whether it is transmitting or receiving). For the purposes of this patent application, the term "angle" or "beam angle" refers to the angle at which the beam lobe has its maximum transmission intensity or reception sensitivity.

In the case of liquid filling materials whose fill level is homogeneous, a selective fill-level measurement suffices. In these cases, the fill-level measuring device is oriented in such a way that the beam lobe of the antenna is directed approximately vertically downwards, and the distance to the filling material determined. If the container geometry of the container interior is known, the filling volume of the filling material in the container can also be determined on the basis of the selectively determined fill-level value and the known container geometry. For this purpose, the container geometry can be presented in tabular form as a so-called tank table. The tank table links the fill-level value with the corresponding filling volume. The tank table can be created by corresponding calibration filling with known quantities or volumes of filling material of the liquid filling material type. The tank table can be created theoretically if the container geometry or its dimensions are known.

In the case of solid-like filling materials, such as gravel or grain, the fill level can, for example, be inhomogeneous due to bulk material cones, so that the intermittent fill-level value determined by the fill-level measurement device is only meaningful to a limited extent. Especially in such cases, it is therefore desirable to be able to determine the distance or fill level in the form of a three-dimensional fill-level profile. For this to be possible, the fill-level measuring device must be designed to be able to assign incoming radar signals to an associated solid angle. This can be achieved, for example, by means of the principle of digital beam shaping, in particular by means of the MIMO principle ("multiple input multiple output").

This principle is based on an antenna assembly consisting of a plurality of transmitting and receiving antennas. Thereby, an orthogonal radar signal to the other transmitting antennas is transmitted via each transmitting antenna, wherein the correspondingly reflected signal is received via each receiving antenna and, if necessary, digitized in order to determine the fill-level profile from the digitized reception signals. In particular, the MIMO method is characterized by its virtually enlarged aperture. As a result, MIMO-based radar systems increase spatial resolution compared to systems without a virtually enlarged aperture. However, the disadvantage of digital beam shaping methods is that ambiguities and angular errors can occur. According to the prior art, the entire hardware required for implementing the MIMO principle can already be integrated so compactly that the transmitting and receiving antennas are accommodated as patch antennas together with the transmitting/receiving unit, on a common printed circuit board or even as a jointly encapsulated IC ("integrated circuit"). MIMO-based radar systems are described in more detail, for example, in "*MIMO radar signal processing*" (Jian Li), 2009.

In the case of solid-like filling material, it is also of interest to be able to determine the filling volume in the container in addition to the fill-level profile.

However, tank tables cannot be used to determine the filling volume for rough filling material surfaces or corresponding filling materials, since the determination of filling volume based on a tank table requires a smooth, horizontal filling material surface, as is only the case with liquids.

In addition, depending on the application and type of the filling material, the container for solids often does not form from a geometrically simple body: To avoid the accumulation of filling material, for easier filling and emptying, or for stability reasons, the container walls are often curved, tilted or wavy. In addition, containers often comprise fixtures such as supports, heating, cleaning or maintenance equipment. Therefore, a theoretical derivation of the geometry of the container interior based on the surface contour is only possible with exactly known container geometry. Subsequent changes due to modifications and retrofits make it even more difficult to determine the container geometry from planning documents.

SUMMARY

Accordingly, it is an object of the invention to provide a measuring system by means of which the filling volume in the container can be determined even in the case of non-liquid filling materials.

The invention achieves this object by a measuring system for determining a filling volume of a filling material in a container, comprising the following components:

- a 3D camera, which is designed, for example, as a ToF sensor and can be positioned in such a way to record at least one 3D image of at least one partial region of the container interior,
- a radar-based fill-level measurement device for creating a three-dimensional fill-level profile of the filling material surface in the container, with
  - an antenna arrangement, by means of which according to a principle of digital beam shaping, such as the MIMO principle, radar signals in the direction of the filling material can be emitted, and by means of which corresponding reception signals can be received after reflection of the radar signal on the filling material surface,
  - a transmitting/receiving unit, which is designed to generate the radar signals according to the principle of beam shaping, and according to such principle of beam shaping, at least based on the reception signals, to create the solid angle-dependent fill-level profile, and
- an evaluation unit, which is designed
  - to create a data set based on at least one 3D image, which data set represents the geometry of at least the partial region of the container interior, and
  - to determine the filling volume based on the data set and the fill-level profile.

Thereby, it is necessary to record the 3D images if the container is empty at least in the corresponding partial region.

According to the invention, the fill-level measurement device can be designed, for example, with a grommet for the 3D camera, wherein the antenna arrangement is preferably formed around the, in particular, circular grommet of the fill-level measurement device. This allows an correspondingly compact 3D camera to be directed or lowered through the grommet into the interior of the container when the fill-level measurement device is mounted, in order to record the 3D image. As an alternative to a grommet in the fill-level measurement device or in the antenna arrangement, the 3D camera can also be designed as an integral component of the antenna arrangement. In addition, the evaluation unit can also be designed as a component of the fill-level measurement device or the transmitting/receiving unit.

Corresponding to the measuring system according to the invention or the fill-level measurement device according to the invention, the object on which the invention is based is also achieved by a corresponding measurement method for operating the fill-level measurement device. Accordingly, the method comprises at least the following method steps:

- recording of at least one 3D image of at least one partial region of the container interior by means of the 3D camera,
- creation of a data set that represents the geometry of at least the partial region of the container interior, based on at least one 3D image,
- creation of a solid angle-dependent fill-level profile of the filling material surface by means of the fill-level measurement device, and
- determination of the filling volume based on the data set and the fill-level profile.

Within the framework of this application, the term "3D camera" includes any system by means of which the respective distance values for the nearest object can be recorded as a corresponding pixel value in a selected image region. Thus, for example, so-called ToF cameras ("time of flight") can be used for this purpose, which comprise corresponding semiconductor-based sensors (also known as PMD sensors, "photonic mixing device"). However, the same functionality can also be effected, for example, by means of a so-called light-field camera or at least two interconnected conventional digital cameras.

Within the scope of the invention, the term "unit" in principle refers to any electronic circuit that is designed in a manner suitable for the intended purpose. Depending on the requirement, it may therefore be an analog circuit for generating or processing corresponding analog signals. However, it may also be a digital circuit, such as an FPGA, or a storage medium in interaction with a program. In this case, the program is designed to perform the corresponding method steps or to apply the necessary calculation operations of the respective unit. In this context, various electronic units of the measuring device in the sense of the invention can potentially also access a common physical memory or be operated by means of the same physical digital circuit.

BRIEF DESCRIPTION OF THE DRAWINGS

The invention is explained in more detail with reference to the following figures. In the figures.

DETAILED DESCRIPTION

Figure 1:
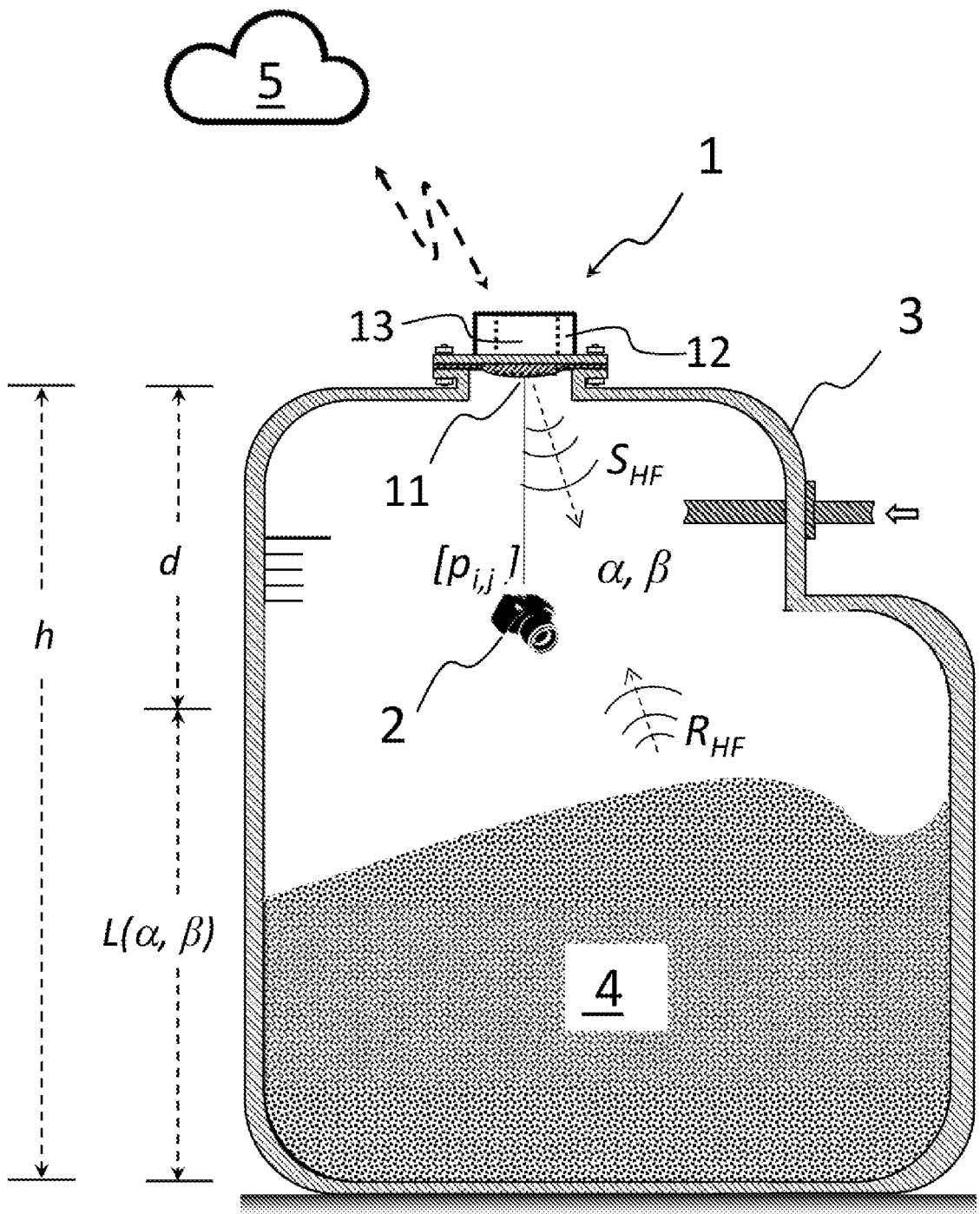
FIG. 1 shows a measuring system according to the present disclosure on a container.

For an understanding of the invention, FIG. 1 shows a container 3 with a filling material 4, the filling volume of which is to be captured. The determination of filling volume according to the invention is based on initially determining the geometry of the container interior by means of a measuring system in the empty state of the container 3 (at least up to the height h of the maximum fill level $L_{max}$ of the filling material 4). In subsequent operation, the current filling volume can be determined by means of the stored container geometry and the currently measured fill-level value $L(\alpha, \beta)$ with a (partially) filled container 4. In this case, the container 3 can be up to more than 100 m high, depending on the type and field of application.

As shown schematically in FIG. 1, undercuts often occur in the container interior, which are required, for example, due to the external installation position of the container 3. Thus, at least in such cases, it is not practical to theoretically determine the container geometry by means of which the filling volume can be set in relation to the fill level $L(\alpha, \beta)$. Therefore, the measuring system comprises a 3D camera 2, by means of which in the empty state of the container 3, 3D images $[p_{i,j}]$ of the corresponding partial regions of the container interior are initially recorded. A data set is created from the 3D images $[p_{i,j}]$, which data set represents the 3D coordinates or the geometry of the container interior up to at least the maximum level $L_{max}$. For further processing, a complete, digital spatial model can also be created from such data set. In order to be able to record the 3D images, the 3D camera 2 is optionally positioned at variable positions within the container 3 or at a suitable opening of the container 3, so that after the recording of the 3D images $[p_{i,j}]$ no shaded partial regions of the container interior due to any undercuts remain. In order to be able to determine the corresponding position and/or orientation of the 3D camera 2 within the container 3 for the subsequent calculation of the geometric data or the spatial model, corresponding acceleration or inertial sensors can be assigned to the 3D camera 2, for example.

For determining the fill level $L(\alpha,\beta)$, the measuring system comprises a radar-based fill-level measurement device 1, which is attached at a known installation height h above the filling material 4 on the container 3. The fill-level measurement device 1 is aligned and fastened to the container 3 in such a way that it emits, via an antenna arrangement 11, corresponding radar signals SHF with respect to a vertical axis in the direction of the surface of the filling material 2. After reflection of the radar signal $S_{HF}$ at the filling material surface, the fill-level measurement device 1 receives the reflected radar signal $R_{HF}$ via the antenna assembly 11 as a function of the distance $d(\alpha,\beta)$ between the fill-level measurement device 1 and the filling material surface according to $$d(\alpha,\beta)=h-L(\alpha,\beta)$$

As indicated in FIG. 1, the surface of the filling material 4 is not planar. This can occur in particular in the case of bulk-type filling materials 4, for example when bulk cones form during filling of the container 3. In addition, when the filling material 4 is being pumped out, conic depressions can occur on the filling material surface. For this reason, the fill-level measurement device 1 is designed to determine the fill level L within a defined solid-angle range [α; β] in the form of a three-dimensional fill-level profile $L(\alpha, \beta)$. As the primary measurement result, the fill-level measurement device 1 determines per measurement corresponding coordinate data of a dot grid on the filling material surface. From this, the fill-level profile $L(\alpha, \beta)$ is generated as a three-dimensional surface model by means of interpolation of the coordinate data. Since the angles α, β running perpendicular to one another of the solid-angle range [α; β] each refer to the vertical axis emanating from the fill-level measurement device 1, the fill-level profile $L(\alpha, \beta)$ or the underlying coordinate data is originally in the form of polar coordinates α; β. For the conversion of the polar coordinate-based fill-level profile L(x, y) into a Cartesian coordinate system, the respective angle α, β (since this is known as well as the respective measured distance $d(\alpha, \beta)$, since measured by the fill-level measurement device 1) can be converted using common coordinate transformation methods.

For the solid angle-dependent determination of the fill level $L(\alpha, \beta)$, the MIMO principle is implemented as a principle for digital beam shaping in a transmitting/receiving unit 12 of the fill-level measurement device 1, which controls the antenna arrangement 11. This means that the transmitting/receiving unit 12 generates the radar signals $S_{HF}$ to be emitted according to the defined MIMO principle and creates the solid angle-dependent fill-level profile $L(\alpha, \beta)$ based on the $R_{HF}$ reception signals on the basis of the MIMO principle. As a result, the fill-level measurement device 1 can assign a corresponding fill-level value $L(\alpha; \beta)$ to each solid angle α; β within the solid-angle range [α; β]. It goes without saying that, within the scope of the invention, any other principle of (digital) beam shaping can be implemented in the transmitting/receiving unit 12 instead of the MIMO principle.

Via an interface, such as "PROFIBUS," "HART" or "Wireless HART," the fill-level measurement device 1 can be connected to a higher-level unit 4, such as a process control system or a decentralized data storage device. The fill-level profile L(x, y); $L(\alpha, \beta)$ can be transmitted via this, for example, to control any inflows or outflows of the container 3. In addition, other information, for example regarding the general operating status of the fill-level measurement device 1, can also be communicated. However, within the scope of the invention, the interface can also be used in particular to establish, if necessary, direct communication with the 3D camera 2 within the measuring system.

In the case of direct communication between the fill-level measurement device 1 and the 3D camera 2, it is possible, for example, that the 3D images $[p_{i,j}]$ determined by the 3D camera 2, which serve to determine the container geometry, are transmitted to the fill-level measurement device 1. In this case, for example, a correspondingly designed evaluation unit 12 of the fill-level measurement device 1 can create the data set based on at least one 3D image $[p_{i,j}]$ of the digital spatial model, based on which the geometry of the relevant partial region of the container interior is represented, in order to determine from this, in turn, the current filling volume in conjunction with the respective current fill-level profile $L(\alpha, \beta)$. Correspondingly, it is also conceivable that the data set or the spatial model, by means of which the geometry of the relevant partial region of the container interior is described, is already created in a corresponding evaluation unit of the 3D camera 2, before this is transmitted to the fill-level measurement device 1 for determining the filling volume.

In contrast to direct communication between the fill-level measurement device 1 and the 3D camera 2, it is also possible to transfer the current fill-level profile $L(\alpha, \beta)$ from the fill-level measurement device 1 and either the 3D images $[p_{i,j}]$ or already the calculated container geometry data set from the 3D camera 2 to the higher-level unit 5.

In this case, the higher-level unit 5 can act as an evaluation unit, in order to determine the container geometry based on the 3D images $[p_{i,j}]$, or to determine the current filling volume from this in conjunction with the current fill-level profile $L(\alpha, \beta)$.

Depending on the unit in which the filling volume is determined based on the geometry of the container interior and the fill-level profile $L(\alpha, \beta)$, any angular errors and/or ambiguities of the fill-level measurement device 1 can also be compensated there, in particular by matching the fill-level profile $L(\alpha, \beta)$ with the geometry of the container interior.

Figure 2:
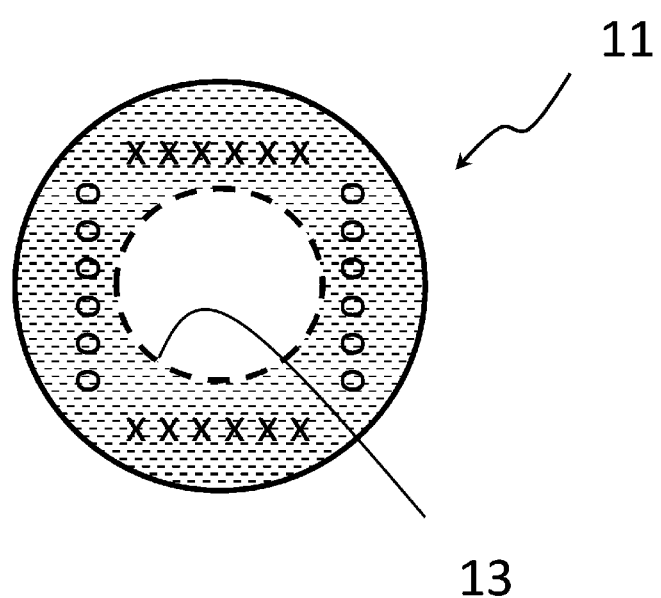
FIG. 2 shows a front view of the antenna arrangement of the fill-level measurement device according to the present disclosure.

As indicated in FIG. 1, the fill-level measurement device 1 is designed with a continuous grommet 13, so that the 3D camera 2 can be lowered through the grommet 13, for example on a telescopic rod, into the container interior to record the required 3D images $[p_{i,j}]$ and swiveled accordingly. After recording the 3D images $[p_{i,j}]$ or before filling the container 3, the 3D camera 2 is removed from the container interior. A frontal view of the antenna arrangement 11 designed for this is shown in FIG. 2: With this embodiment, the transmitting and receiving antennas of the antenna arrangement 11 are arranged around the circular grommet 13. The individual transmitting or receiving antennas are arranged in two straight rows each, which extend tangentially outside the circular grommet 13 and opposite one another on the grommet 13. In contrast to the embodiment of the fill-level measurement device 1 according to the invention with integrated grommet 13 for the 3D camera shown in FIG. 1 and FIG. 2, it is also conceivable to design the 3D camera as a fixed component of the antenna arrangement 11, for example, instead of the grommet 13 in the middle between the transmitting and receiving antennas arranged in rows. However, with this embodiment not shown in more detail, the potential field of view for recording the 3D images $[p_{i,j}]$ is reduced, so that the fill-level profile $L(\alpha, \beta)$ may only be determined on containers 3 with low geometric complexity.

The invention claimed is:

1. A measuring system for determining a filling volume of a filling material in a container, comprising:
   a 3D camera that can be positioned to record at least one 3D image of at least one partial region of the container interior;
   a radar-based fill-level measurement device for creating a fill-level profile of a filling material surface, the fill-level measurement device including:
      an antenna arrangement via which according to a principle of digital beam shaping radar signals in a direction of the filling material can be emitted, and via which corresponding reception signals can be received after reflection of the radar signal on the filling material surface; and
      a transmitting/receiving unit designed to generate the radar signals according to the principle of beam shaping, and according to the principle of beam shaping, at least based on the reception signals, to create the fill-level profile in a solid-angle-dependent manner; and
   an evaluation unit designed to create a data set based on the at least one 3D image, wherein the data set represents a geometry of the at least one partial region of the container interior, and to determine the filling volume based on the data set and the fill-level profile,
   wherein the 3D camera is designed as a component of the antenna arrangement of the fill-level measurement device.

2. The measuring system according to claim 1, wherein the evaluation unit is designed as a component of the fill-level measurement device.

3. The measuring system according to claim 1, wherein the 3D camera is designed as a time-of-flight (ToF) sensor.

4. A method for determining a filling volume of a filling material in a container, comprising:
   providing a measuring system, including:
      a 3D camera that can be positioned to record at least one 3D image of at least one partial region of the container interior;
      a radar-based fill-level measurement device for creating a fill-level profile of a filling material surface, the fill-level measurement device including:
         an antenna arrangement via which according to a principle of digital beam shaping radar signals in a direction of the filling material can be emitted, and via which corresponding reception signals can be received after reflection of the radar signal on the filling material surface; and
         a transmitting/receiving unit designed to generate the radar signals according to the principle of beam shaping, and according to the principle of beam shaping, at least based on the reception signals, to create the fill-level profile in a solid-angle-dependent manner; and
      an evaluation unit designed to create a data set based on the at least one 3D image, wherein the data set represents a geometry of the at least one partial region of the container interior, and to determine the filling volume based on the data set and the fill-level profile,
      wherein the 3D camera is designed as a component of the antenna arrangement of the fill-level measurement device;
   recording the at least one 3D image of the at least one partial region of the container interior using the 3D camera;
   creating a data set representing the geometry of the at least one partial region of the container interior based on the at least one 3D image;
   creating the fill-level profile of the filling material surface using the fill-level measurement device; and
   determining the filling volume based on the data set and the fill-level profile.

5. The method according to claim 4, wherein the at least one 3D image is recorded, provided that the container is empty in the at least one partial region.

6. A fill-level measurement device for creating a fill-level profile of a surface of a filling material in a container, comprising:
   an antenna arrangement via which according to a principle of digital beam shaping, radar signals in a direction of the filling material can be emitted and via which corresponding reception signals can be received after reflection of the radar signal on the filling material surface; and
   a transmitting/receiving unit designed to generate the radar signals according to the principle of beam shaping, and according to the principle of beam shaping, at least based on the reception signals, to create the fill-level profile in a solid-angle-dependent manner,
   wherein the antenna arrangement of the fill-level measurement device is formed around a circular grommet of the fill-level measurement device so that a 3D camera through the grommet in the container interior is directional.

7. The fill-level measurement device according to claim 6, wherein the transmitting/receiving unit is designed to generate the radar signals according to a multiple input multiple output (MIMO) principle and to create the fill-level profile according to the MIMO principle.

* * * * *